(12) United States Patent
Plante (10) Patent No.: US 10,449,690 B1
(45) Date of Patent: Oct. 22, 2019

(54) CHAINSAW HOLDER

(71) Applicant: Richard R. Plante, Goffstown, NH (US)

(72) Inventor: Richard R. Plante, Goffstown, NH (US)

( * ) Notice: Subject to any disclaimer, the term of this patent is extended or adjusted under 35 U.S.C. 154(b) by 0 days.

(21) Appl. No.: 15/939,411

(22) Filed: Mar. 29, 2018

(51) Int. Cl.
| B27G 19/00 | (2006.01) |
| B23Q 13/00 | (2006.01) |
| B27B 17/00 | (2006.01) |
| E06C 7/16 | (2006.01) |
| F16M 13/02 | (2006.01) |

(52) U.S. Cl.
CPC ........... *B27G 19/003* (2013.01); *B23Q 13/00* (2013.01); *B27B 17/0008* (2013.01); *E06C 7/16* (2013.01); *F16M 13/02* (2013.01)

(58) Field of Classification Search
CPC .. B27G 19/003; B23Q 13/00; B27B 17/0008; B27B 17/00; B27B 17/0083; B27B 17/02; E06C 7/16; F16M 13/02; Y10T 29/49798; Y10T 29/49908; Y10T 29/49995; B25B 1/00; B25B 11/00
USPC .... 211/70.6; 248/210, 211, 238, 216.1, 247, 248/300, 301, 309.1; 30/381–387; 269/289 R, 30.21, 95
See application file for complete search history.

(56) References Cited

U.S. PATENT DOCUMENTS

| 757,740 | A | | 4/1904 | Happe | |
| 831,770 | A | | 9/1906 | Bragg | |
| 831,771 | A | | 9/1906 | Bragg | |
| 2,439,568 | A | * | 4/1948 | Hall | B23Q 13/00 150/161 |
| 2,617,189 | A | | 11/1952 | Brown | |
| 2,638,944 | A | | 5/1953 | Woleslagle | |
| 2,693,724 | A | * | 11/1954 | Currie | B23D 63/162 76/31 |
| 2,775,275 | A | * | 12/1956 | Forbes | B23Q 13/00 30/167 |
| 2,779,367 | A | * | 1/1957 | Forbes | B23Q 13/00 30/167 |
| 2,948,315 | A | * | 8/1960 | Fifarek | B23Q 13/00 224/246 |
| 3,104,688 | A | * | 9/1963 | Bretthauer | B27G 19/06 83/441.1 |
| 3,207,395 | A | | 9/1965 | Dunn | |
| 3,344,818 | A | * | 10/1967 | Musgrove | B23Q 13/00 30/151 |

(Continued)

FOREIGN PATENT DOCUMENTS

WO 2012160422 A1 11/2012

*Primary Examiner* — Jennifer E. Novosad
(74) *Attorney, Agent, or Firm* — Sarita L. Pickett (57) ABSTRACT

A chainsaw holder has a holder body. The holder body includes a top hook portion having a first segment, a second segment, and a third segment forming a top hook portion opening, a cutter bar retaining portion having a proximal retaining portion end and a distal retaining portion end where the proximal retaining portion end is connected to the top hook portion, and a guard portion connected to the distal retaining portion end. The cutter bar retaining portion forms a bump out that extends away from the top hook portion opening where the bump out has a first slot and a second slot spaced and parallel to the first slot where the second slot is aligned with the first slot.

17 Claims, 9 Drawing Sheets

(56) References Cited

U.S. PATENT DOCUMENTS

| | | | | |
|---|---|---|---|---|
| 4,063,358 A | * | 12/1977 | Hodge | B27G 19/003 30/371 |
| 4,109,900 A | * | 8/1978 | Vandecoevering | B23D 63/162 269/102 |
| 4,160,319 A | * | 7/1979 | Caruso | B23D 59/007 30/122 |
| 4,306,600 A | | 12/1981 | Lonsinger, Jr. | |
| 4,342,243 A | * | 8/1982 | Porritt | B27B 17/0041 83/440.2 |
| 4,369,575 A | * | 1/1983 | Schurman | B25H 3/006 206/349 |
| 4,371,079 A | | 2/1983 | Dembicks | |
| 4,597,178 A | | 7/1986 | Dolata et al. | |
| 4,606,252 A | * | 8/1986 | Lahti | B27B 17/0058 83/574 |
| 4,657,234 A | | 4/1987 | Stout | |
| 4,991,807 A | * | 2/1991 | Radnich | A47K 5/02 248/206.3 |
| 5,078,119 A | * | 1/1992 | Holmes | B23Q 9/0014 125/13.01 |
| 5,078,353 A | * | 1/1992 | Linn | B25H 3/006 211/70.6 |
| 5,099,580 A | * | 3/1992 | Stegall | B27B 17/0083 30/371 |
| 5,321,890 A | * | 6/1994 | LaBlue | B23Q 11/0053 30/124 |
| 5,435,065 A | * | 7/1995 | Raczykowski | B27B 17/0083 30/382 |
| 5,675,900 A | * | 10/1997 | Favre | B23D 51/01 30/507 |
| 5,706,941 A | | 1/1998 | Erisoty | |
| 6,038,775 A | * | 3/2000 | Holladay | B23Q 9/0028 30/376 |
| 6,076,261 A | * | 6/2000 | Eriksson | B26B 29/025 206/349 |
| 6,082,420 A | * | 7/2000 | Milner | A01G 23/097 144/4.1 |
| 6,112,632 A | * | 9/2000 | Buchholtz | B27B 33/141 83/830 |
| 6,205,668 B1 | * | 3/2001 | Fournier, Jr. | B23Q 13/00 144/251.1 |
| 6,389,700 B2 | | 5/2002 | Paquin | |
| 6,434,838 B1 | * | 8/2002 | Mai | B23Q 13/00 30/151 |
| 6,460,841 B1 | * | 10/2002 | Durr | A47J 47/005 269/289 R |
| 6,648,152 B2 | | 11/2003 | Bermes | |
| 7,140,114 B2 | * | 11/2006 | Shenker | B27G 19/003 30/382 |
| 7,422,201 B2 | * | 9/2008 | Pearl | A47J 47/005 269/289 R |
| 7,481,256 B2 | | 1/2009 | Sayers | |
| 7,624,862 B1 | * | 12/2009 | Pleggenkuhle | B27B 17/00 206/349 |
| 7,762,510 B2 | * | 7/2010 | Eller | B27B 17/00 211/70.6 |
| 7,850,440 B2 | * | 12/2010 | Alvidrez | A21C 11/008 269/302.1 |
| 8,262,070 B2 | * | 9/2012 | Liu | B60R 11/0241 269/254 R |
| 8,590,877 B2 | * | 11/2013 | Zeitlin | A47J 47/005 269/289 R |
| 8,813,374 B2 | | 8/2014 | Lank et al. | |
| D713,141 S | * | 9/2014 | Reeves | D3/220 |
| 10,160,126 B2 | * | 12/2018 | Ranieri | B26B 29/025 |
| D839,706 S | * | 2/2019 | Nelson | D8/65 |
| 2001/0025423 A1 | * | 10/2001 | Paquin | B27B 17/02 30/382 |
| 2003/0010734 A1 | * | 1/2003 | Bermes | B25H 3/006 211/70.6 |
| 2004/0040163 A1 | * | 3/2004 | Lin | B23Q 13/00 30/478 |
| 2007/0214658 A1 | * | 9/2007 | Payton | B27B 17/0083 30/371 |
| 2008/0121080 A1 | * | 5/2008 | Liu | B27G 19/02 83/397 |
| 2008/0164400 A1 | * | 7/2008 | Beechinor | B27B 17/0008 248/500 |
| 2010/0229405 A1 | * | 9/2010 | Lank | B23Q 13/00 30/382 |
| 2014/0053682 A1 | * | 2/2014 | Bendien | F16P 1/00 74/612 |
| 2014/0151420 A1 | | 6/2014 | Reeves | |
| 2015/0083620 A1 | * | 3/2015 | McGarry | B25H 3/006 206/349 |
| 2016/0214253 A1 | * | 7/2016 | Yanuszka | B25H 3/006 |
| 2018/0339423 A1 | * | 11/2018 | Zeno | B27B 17/02 |
| 2019/0016007 A1 | * | 1/2019 | Hancock | B27B 17/02 |

\* cited by examiner

CHAINSAW HOLDER

BACKGROUND OF THE INVENTION

1. Field of the Invention

The present invention relates generally to tools and accessories. Particularly, the present invention relates to a tool holder for portable power tools.

2. Description of the Prior Art

Tools are widely used in construction, maintenance, industrial facilities, and emergency situations. Some tasks require work be completed at elevated heights and are extremely time- and space-sensitive. For safety reasons, tools may be secured to relatively stationary objects such as people or structures such as buildings, vehicles, and equipment such as ladders or aerial buckets and the like. Previous methods for securing tools include holding tools in a receptacle or placing them on the floor of an aerial bucket while not in use. Previous methods can be improved by providing an apparatus to provide convenient access to the tool while preserving premium space for other critical functions.

One approach of securing tools is disclosed in U.S. Pat. No. 4,657,234 to Stout for a chain saw holder. The chain saw holder includes a clamp for clamping to a fixed support, an extension member extending away from the clamp to a handle bar attachment, a mouth on the handle bar attachment for receiving the handle bar and releasably gripping the handle bar. The attachment is adapted to provide for pivotal movement of the mouth about an axis generally perpendicular to the extension member so that the gripped portion of the handle bar is received by the mouth and is gripped in any orientation aligned with, oblique to, or perpendicular to the extension member. The chain saw holder is capable of holding and supporting the saw regardless of the orientation of the fixed support.

Another approach of securing tools is disclosed in U.S. Pat. No. 6,648,152 B2 to Bermes for a chain saw holder. The chain saw holder includes a cutter bar retaining portion for frictionally engaging the chain saw cutter bar and a handle retaining portion for selectively receiving and capturing the chain saw elongate front handle. It also has a stop member selectively movable along an elongate arm for selective placement over the U-shaped section which is able to capture the chain saw handle.

Another approach of securing tools is disclosed in U.S. Published Application No. 2014/0151420 A1 to Reeves for a tool holder for an aerial bucket lift. The tool holder for an aerial bucket lift includes a backboard with left, right, front, and back sides. A left side member and a right side member are attached to the left and right sides, respectively, of the backboard. A scabbard portion is attached to the front side of the backboard; it forms a pocket with the backboard. A left hook and a right hook extend from the left side member and right side member, respectively, which are configured to couple to a bucket of an aerial bucket lift.

SUMMARY OF THE INVENTION

Holders can be used to store and/or carry a variety of tools. Different types of holders hold and support different types of tools and are often molded to the type of tool they are intended to store and/or carry. For example, a holder may store and/or carry a hammer, chainsaw, personal breathing apparatus, or firearm. Each of these holders may be molded into a different shape to better fit the particular tool it holds. A tool holder is often attached to a relatively stationary object such as a vehicle, an aerial apparatus, a building, or a person.

Real estate on and within aerial apparatuses is at a premium, but the proper tools are still necessary to complete tasks. Some holders may be attached to aerial apparatuses such as aerial bucket trucks, fire truck ladder buckets and the like or to ladders having reinforcing structures. Attaching a holder to an aerial apparatus allows a user to secure a tool to the aerial apparatus to maximize space while still providing access to necessary tools. In firefighting situations, such available space may be critical when the aerial apparatus is used for saving a person from a burning building.

Previous methods can be improved upon by further providing a chainsaw holder affixable to an aerial apparatus.

It is an object of the present invention to provide a chainsaw holder.

It is another object of the present invention to provide a mechanism for securing a chainsaw while occupying a minimal amount of space.

It is still another object of the invention to provide a space efficient mechanism for attaching a chainsaw to an aerial apparatus. The present invention achieves these and other objectives by providing a chainsaw holder to secure a chainsaw to an aerial apparatus. In one embodiment of the present invention, the chainsaw holder has unitary holder body. The unitary holder body has an inside body surface, an outside body surface, a holder body width, a holder body length that is greater than the holder body width, a top hook portion having a top hook portion opening oriented parallel to the inside surface, a cutter bar retaining portion having a proximal retaining portion end and a distal retaining portion end, the cutter bar retaining portion connected on the proximal retaining portion end to the top hook portion, and a guard portion connected to and extending from a distal retaining portion end where the cutter bar retaining portion forms a bump out that extends away from the top hook portion opening and relative to the top hook portion and the guard portion. The cutter bar retaining portion has an entry portion with a second slot extending completely through the entry portion and an exit portion with a first slot extending completely through the exit portion where the second slot and the first slot are aligned to thereby allow a distal end of a cutter bar of a chainsaw to extend through the second slot and the first slot with the second slot being adjacent a proximal end of the cutter bar of the chainsaw.

In another embodiment, the top hook portion has a first segment, a second segment extending perpendicularly from the first segment, and a third segment extending perpendicularly from the second segment and parallel to and facing the first segment wherein the third segment extends to and is connected to the proximal retaining portion end of the cutter bar retaining portion and wherein the first segment, the second segment and a portion of the third segment form a U-shaped cross-section portion.

In further embodiment, the U-shaped cross-section portion is transverse to the holder body length.

In another embodiment, the U-shaped cross-section portion is approximately perpendicular to the holder body length.

In still another embodiment, the U-shaped cross-section is approximately at a 45° angle to the holder body length.

In yet another embodiment, the chainsaw holder includes at least one bumper portion attached to the guard portion on the inside body surface.

In another embodiment, the entry portion meets the exit portion at an approximate right angle.

In another embodiment, the top hook portion is adapted to attach to a relatively stationary object.

In still another embodiment, the relatively stationary object is one of an aerial bucket lift, an aerial fire bucket or a ladder apparatus.

In one embodiment of the present invention, the entry portion aperture is a slot having a length that is 1.1 to 1.7 the width of a chainsaw cutter bar and a width that is in a range of 1.1 to 1.3 times a thickness of the chainsaw cutter bar.

In another embodiment, the exit portion aperture is a slot having a width larger than the width of the entry portion aperture.

In another embodiment, the exit portion aperture is a slot having a length that is 1.1 to 1.7 the width of a chainsaw cutter bar and a width that is in a range of 2.0 to 4.4 times a thickness of the chainsaw cutter bar.

In another embodiment, a ratio of the holder body length to the holder body width is in a range of 2.0 to 3.8.

In one embodiment of the present invention, the entry portion and the exit portion together have a lineal distance of approximately 6 inches.

In another embodiment of the present invention, the chainsaw holder has an integral holder body. The integral holder body includes an inside body surface, an outside body surface, a holder body width, a holder body length that is greater than the holder body width, a top hook portion having a top hook portion opening oriented parallel to the inside surface, a cutter bar retaining portion having a proximal retaining portion end and a distal retaining portion end, and a guard portion connected to and extending from the top hook portion as a continuous sheet. The cutter bar retaining portion is a separate component that is fixedly attached to the guard portion forming a bump out that extends away from the top hook portion opening and relative to the top hook portion and the guard portion. The cutter bar retaining portion has an entry portion with a second slot extending completely through the entry portion and an exit portion with a first slot extending completely through the exit portion where the second slot and the first slot are aligned to thereby allow a distal end of a cutter bar of a chainsaw to extend through the second slot and the first slot with the second slot being adjacent a proximal end of the cutter bar of the chainsaw.

In another embodiment, a method of making a chainsaw holder is disclosed. In this embodiment, a single sheet of bendable yet rigid or semi-rigid material is used. The method includes obtaining the sheet of material for forming a unitary holder body having two sides and a first end and a second end. A first slot is formed through the unitary holder body where the first slot has a length between the at least two sides. The slot is located a predefined distance from the first end of the unitary holder body. A second slot is formed through the unitary holder body where the second slot has a length between the at least two sides. The second slot is located parallel to the first slot and having a width that is narrower than a width of the first slot and where the first slot is between the second slot and the first end of the unitary holder body. A first bend in created in the unitary holder body at approximately a 45° angle a predefined distance from the first end of the unitary holder body where the first bend is adjacent to the first slot. A second bend is created in the unitary holder body at approximately a 90° angle a predefined distance from the first bend. The second bend is formed in an opposite direction from the first bend, the second bend being at a predefined distance that is at approximately midway between the first slot and the second slot where a sheet portion between the first bend and the second bend forms the exit portion. A third bend is created in the unitary holder body at approximately a 45° angle a predefined distance from the second bend, the third bend being in an opposite direction from the second bend. The third bend is located at a predefined distance that positions the second slot approximately midway between the second bend and the third bend where a portion of the unitary holder body between the second bend and the third bend forms the entry portion. The top hook portion is formed at the second end of the unitary holder body having one of a first orientation or a second orientation.

When selecting the first orientation for the chainsaw holder, the unitary holder body is cut perpendicularly to the holder body width at a predefined distance from the third bend, the predefined distance being sufficient to form the top hook portion at the second end. A fourth bend is created in the unitary holder body at approximately a 90° angle a predefined distance from the third bend, the fourth bend being in an opposite direction from the third bend, and a fifth bend in the unitary holder body is created at approximately a 90° angle a predefined distance from the fourth bend, the fifth bend being formed in the same direction as the fourth bend where the fourth bend and the fifth bend form a U-shaped cross-section.

When selecting the second orientation for the chainsaw holder, the unitary holder body is cut at an angle that is transverse to holder body width forming the second end into an angled end of the unitary holder body that is opposite the first end. A fourth bend is created that is parallel to the angled end of the unitary holder body. The fourth bend is formed at approximately a 90° angle a predefined distance from the angled end, the fourth bend being in an opposite direction from the third bend. A fifth bend is created in the unitary body at approximately a 90° angle a predefined distance between the angled end and the fourth bend and parallel to the angled end. The fifth bend is formed in the same direction as the fourth bend, the fourth bend and the fifth bend forming a U-shaped cross-section.

DETAILED DESCRIPTION OF THE INVENTION

The embodiments of the present invention are illustrated in FIGS. 1-18.

Figure 1:
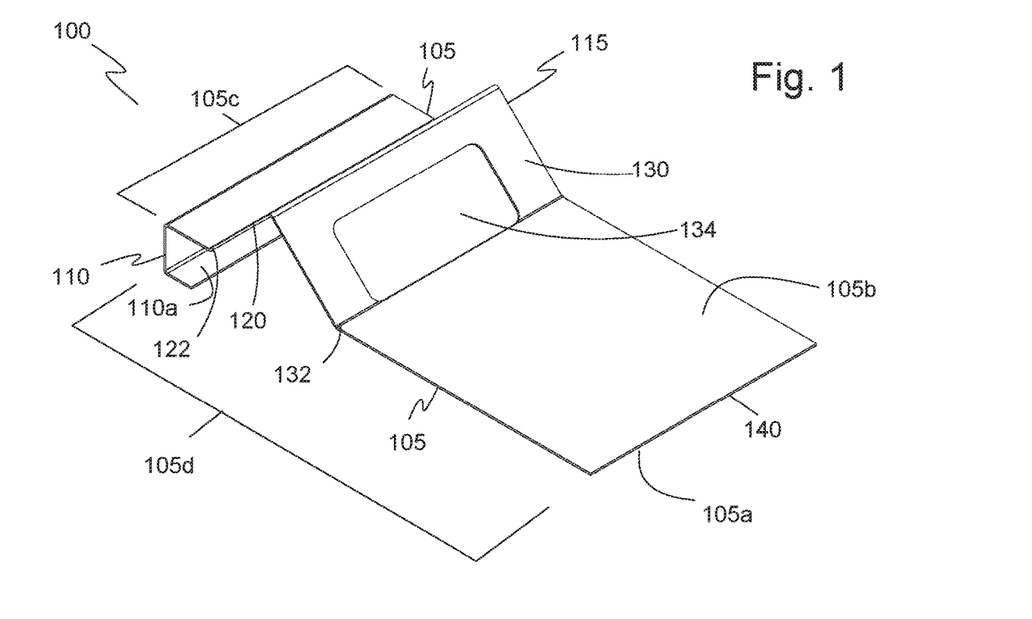
FIG. 1 is a front, perspective view of one embodiment of the present invention showing a chainsaw holder with a unitary holder body.

FIG. 1 shows one embodiment of the chainsaw holder 100 of the present invention has a unitary holder body 105. Unitary holder body 105 includes a top hook portion 110 with a top hook portion opening 110a, a cutter bar retaining portion 115, and a guard portion 140. Cutter bar retaining portion 115 has an entry portion 120, an exit portion 130, a proximal retaining portion end 122 and a distal retaining portion end 132. Between proximal retaining portion end 122 and distal retaining portion end 132 is entry portion 120 and exit portion 130. Entry portion 120 is connected to exit portion 130. Entry portion 120 and exit portion 130 are between the top hook portion 110 and the guard portion 140, forming an angled connecting bridge between the top hook portion 110 and the guard portion 140. Exit portion 130 includes a first slot 134. Cutter bar retaining portion 115 has a cross-section that is an inverted V-shape.

Figure 2:
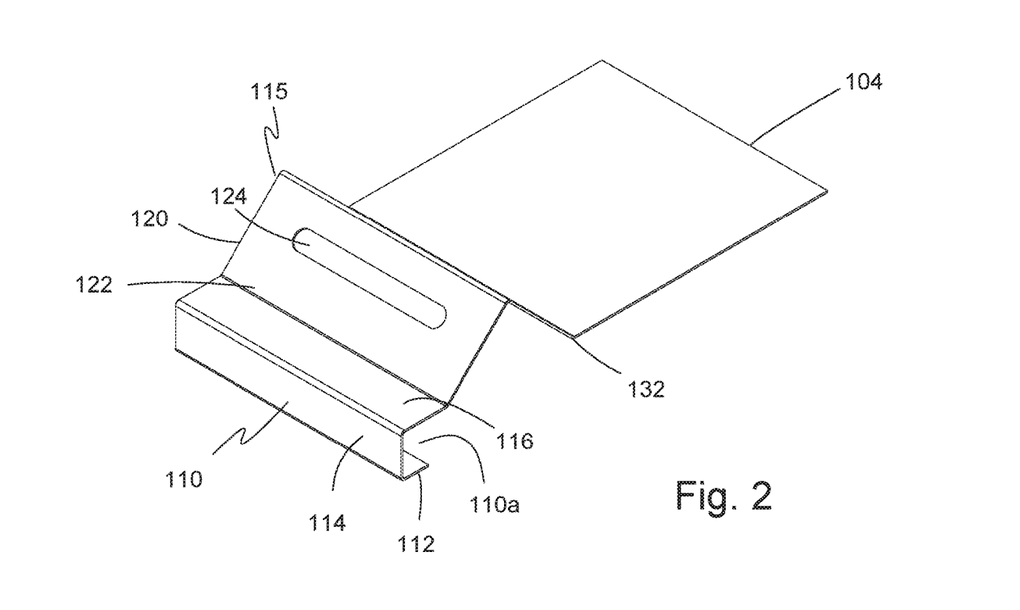
FIG. 2 is a rear, perspective view of the chainsaw holder shown in FIG. 1.

FIG. 2 is rear perspective view of chainsaw holder 100. Entry portion 120 has a second slot 124 disposed in and extending completely through the entry portion 120. Entry portion 120 connects third segment 116 to exit portion 130. Similarly, exit portion 130 connects entry portion 120 to guard portion 140. As seen in the FIGS. 1 and 2, cutter bar retaining portion 115 forms a bump out away from top hook portion opening 110a relative to top hook portion 110 and guard portion 140, Top hook portion 110 has a first segment 112, a second segment 114, and a third 116. Second segment 114 is between first segment 112 and third segment 116 forming a connecting bridge between first segment 112 and third segment 116. First segment 112 is substantially parallel to and facing third segment 116 and substantially perpendicular to second segment 114. In this embodiment, top hook portion 110 has a U-shaped cross-section that is transverse to a holder body length 105d.

Figure 18:
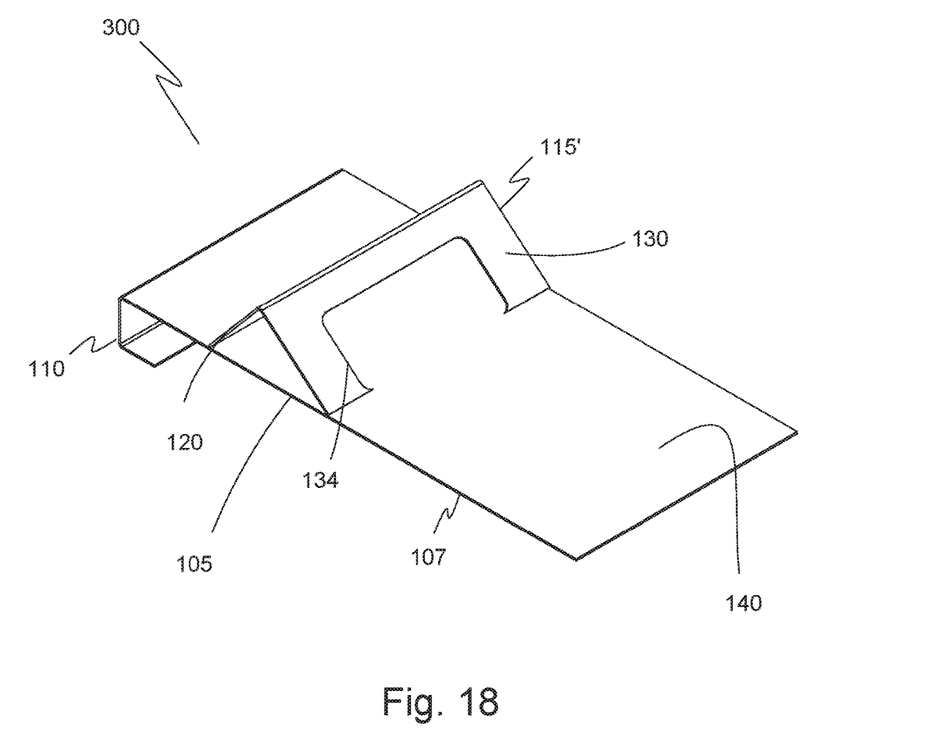
FIG. 18 is a front perspective view of another embodiment of the present invention showing a chainsaw holder with a cutter bar retaining portion fixedly attached to a holder body.

It is contemplated that chainsaw holder 100 may optionally have a unitary holder body 105 made of a bendable yet rigid material. Unitary body holder 105 has an inside body surface 105a, an outside surface 105b, a holder body width 105c, the holder body length 105d that is greater than holder body width 105c into which is formed top hook portion 110, entry portion 120, exit portion 130, and guard portion 140. It is also contemplated that chainsaw holder 100 has a holder body 107 and a separate cutter bar retaining portion 115' that is fixedly attached to the holder body 105'. This is best shown in FIG. 18.

Figures 3, 4:
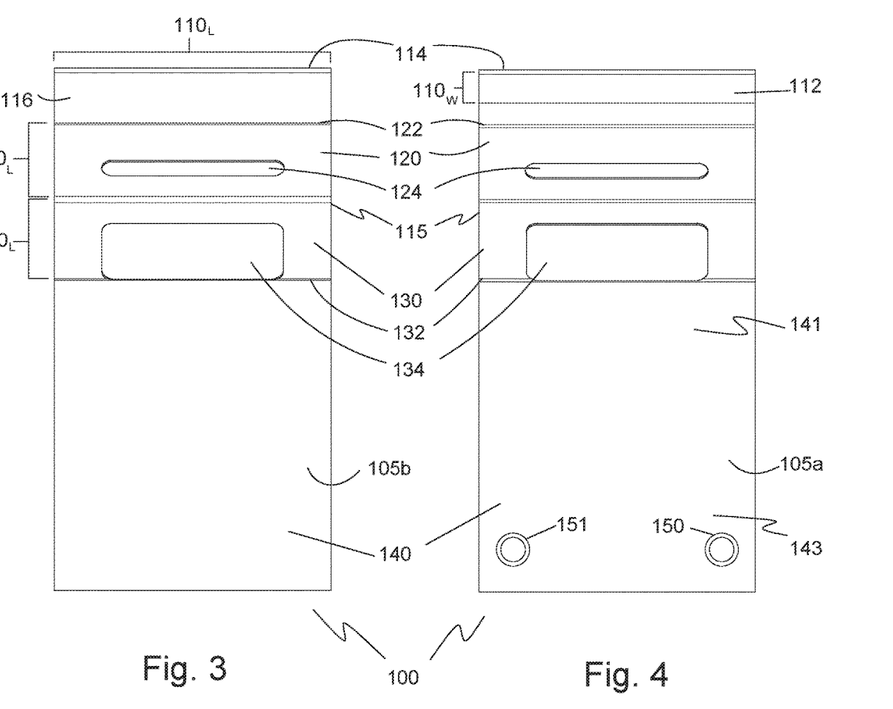
FIG. 3 is a top view of the chainsaw holder shown in FIG. 1.
FIG. 4 is a bottom view of the chainsaw holder shown in FIG. 1.

FIG. 3 shows a top view of chainsaw holder 100 of FIG. 1. Top hook portion 110 has a third segment 116 connecting second segment 114 to entry portion 120. Entry portion 120 has a second slot 124 disposed in and extending completely through the entry portion 120. Entry portion 120 connects top hook portion 110 to exit portion 130 which further connects to guard portion 140.

Top hook portion 110 has a top hook portion length $110_L$. Second segment 114 has a second segment length $114_L$ and third segment 116 has a third segment length $116_L$. Further, entry portion 120 has an entry portion lineal length $120_L$ and exit portion 130 has an exit portion lineal length $130_L$. In one embodiment, each of entry portion length 120L and exit portion length 130L is approximately 3 inches giving the sum of entry portion length 120L and exit portion length 130L a lineal distance of approximately 6 inches.

FIG. 4 shows a bottom view of the chainsaw holder 100. Top hook portion 110 has three segments 112, 114, and 116. Top hook portion 110 has a top hook portion width $110_W$ and a top hook portion length $110_L$. First segment 112 has a first segment length $112_L$ and second segment 114 has a second segment length $114_L$. Third segment 116 connects second segment 114 to entry portion 120 at proximal retaining portion end 122. Entry portion 120 has second slot 124. Entry portion 120 connects top hook portion 110 to exit portion 130 which is further connected to guard portion 140 at distal retaining portion end 132. Exit portion 130 has first slot 134.

Guard portion 140 has a proximal guard segment 141 adjacent exit base 132 and a distal guard segment 143 opposite proximate guard segment 141. Chainsaw holder 100 has multiple spacer pads 150 and 151 disposed on inside body surface 105a of distal guard segment 143.

Figure 5:
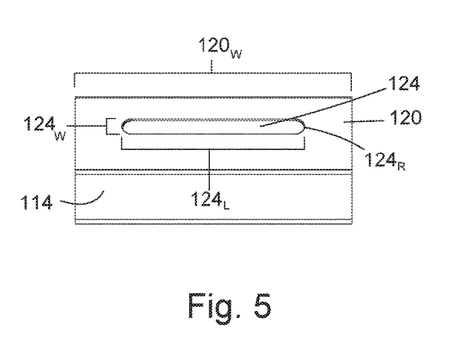
FIG. 5 is a rear plan view of the chainsaw holder shown in FIG. 1.

FIG. 5 shows a rear plan view of chainsaw holder 100. Entry portion 120 has an entry portion width $120_W$ which is equal to exit portion width $130_W$. In the present embodiment, entry portion width $120_W$ is between 5 inches and 11 inches with a typical width of 8 inches. Second slot 124 has a second slot width $124_W$ and a second slot length $124_L$. Second slot 124 may optionally include a second slot radius $124_R$ at the ends of second slot length 124. In the present embodiment, second slot width $124_W$ is typically in a range between 0.25 inch and 0.75 inch with a typical width of 0.625 inch. Top hook portion 110 has a top hook portion length $110_L$. Second segment 114 has a width that is 1 inch or more and connects first segment 112 to third segment 116.

Figure 6:
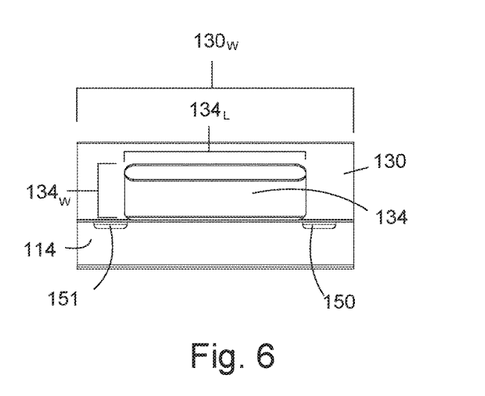
FIG. 6 is a front plan view of the chainsaw holder shown in FIG. 1.

FIG. 6 shows a front plan view of chainsaw holder 100. Exit portion 130 has an first slot 134. Exit portion 130 has an exit portion width $130_W$. In the present embodiment, exit portion width $130_W$ is between 5 inches and 11 inches with a typical width of 8 inches. First slot 134 has a first slot width $134_W$ and a first slot length $134_L$. First slot 134 may optionally include a first slot radius $134_R$ at the ends of first slot length $134_L$. In the present embodiment, first slot width $134_W$ is between 1.0 inches and 1.75 inches with a typical width of 1.625 inches. In this embodiment, first slot width $134_W$ is approximately four times second slot width $124_W$, and first slot length $134_L$ is approximately equal to second slot length $124_L$.

Figures 3A, 13A:
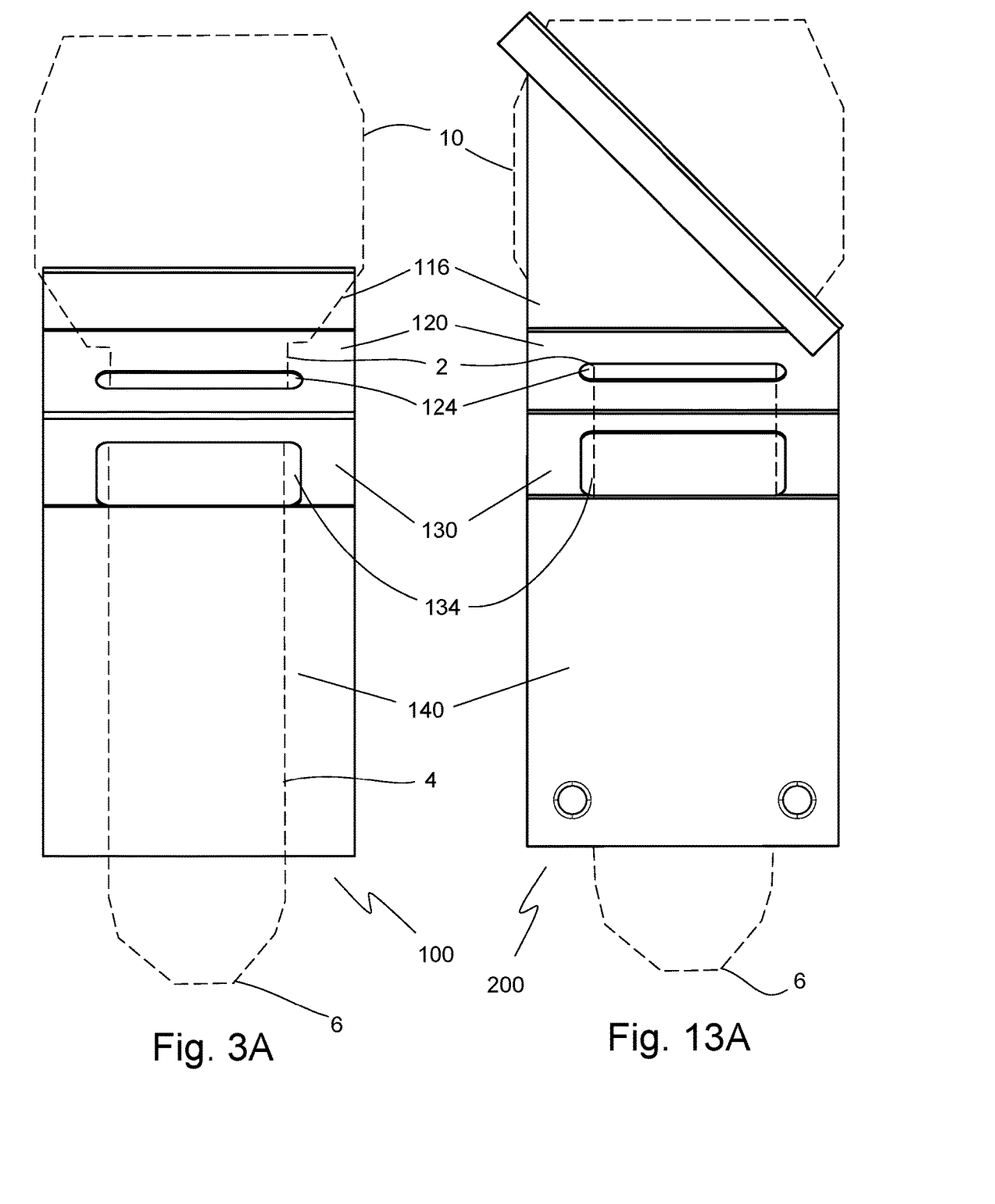
FIG. 3A is the same view of the chainsaw holder shown in FIG. 3, now shown holding a chainsaw.
FIG. 13A is the same view of the chainsaw holder shown in FIG. 13, now shown holding a chainsaw.

FIG. 6 further shows that first slot 134 and second slot 124 are aligned to thereby allow a distal end 2 of a cutter bar 4 of a chainsaw 10 to extend through the second slot 124 and the first slot 134 where the second slot 124 would be adjacent a proximal end 6 of the cutter bar 4 of the chainsaw 10 (see also FIGS. 3A, 13A which uses broken lines to show a general shape of a basic chainsaw as may be held by the chainsaw holder). Because chainsaws are available in different sizes of power and cutter bar dimensions, a ratio of the slot sizes to the cutter bar is more appropriate. Second slot 124 preferably has a length in a range of 1.1 to 1.7 times the width of a chainsaw cutter bar of a selected chainsaw and a second slot width in a range of 1.1 to 1.3 times a thickness of the chainsaw cutter bar of the selected chainsaw. First slot 134 preferably has a length in a range of 1.1 to 1.7 times the width of the chainsaw cutter bar of the selected chainsaw and a width in a range of 2.0 to 4.4 times the thickness of the chainsaw cutter bar of the selected chainsaw. Regarding the dimensions of the holder body, a ratio of the holder body length to the holder body width is in a range of 2.0 to 3.8.

Figure 7:
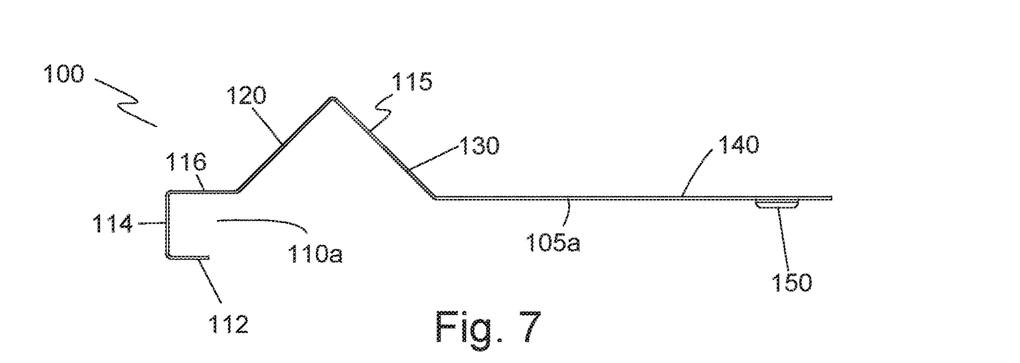
FIG. 7 is a right side view of the chainsaw holder shown in FIG. 1.

FIG. 7 shows a right side view of the chainsaw holder 100. This view clearly illustrates the bump out formed by the cutter bar retaining portion 115 and the top hook portion opening 110a. As previously disclosed, the bump out extends away from top hook portion opening 110a and that top hook portion opening 110a is parallel with and extends away from the inside body surface 105a. Top hook portion 110 includes three segments 112, 114, and 116 and hook portion opening 110a. Entry portion 120 connects top hook portion 110 to exit portion 130 which further connects to guard portion 140. Spacer pad 150 is connected to guard portion 140.

Figure 8:
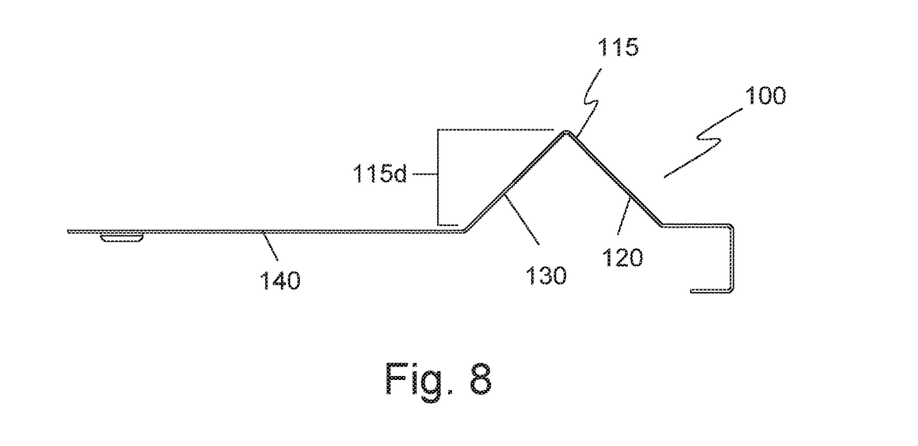
FIG. 8 is a left side view of the chainsaw holder shown in FIG. 1.

FIG. 8 shows a left side view of chainsaw holder 100. The bump out distance 115d of cutter bar retaining portion 115 depends on the angles formed between guard portion 140 and exit portion 130, between exit portion 130 and entry portion 120, and between entry portion 120 and top hook portion 110. The larger the angle between exit portion 130 and entry portion 120, the smaller the bump out distance 115d. Conversely, the smaller the angle between exit portion 130 and entry portion 120, the larger the bump out distance 115d.

In the present embodiment, the dimensions of second slot 124 allow a chainsaw blade to pass through entry portion 120 but prohibit a chainsaw handle from passing through. The dimensions of first slot 134 permit a chainsaw blade to pass through exit portion 130 with leeway for maneuverability.

Figure 9:
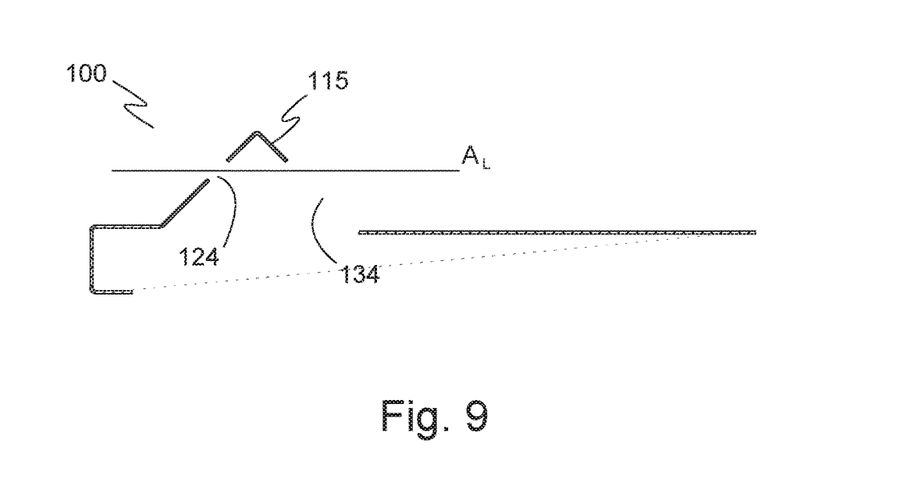
FIG. 9 is a cross-sectional, right side view of the chainsaw holder shown in FIG. 1.

FIG. 9 is a cross-sectional, left-side view of chainsaw holder 100. This view also shows the alignment of first slot 134 and second slot 124 by alignment line AL. In this particular case, second slot 134 aligns more closely with one side of first slot 124 but could be in any position so long as the two slots 124, 134 are aligned to allow a cutter bar of a chainsaw to pass through both slots 124, 134.

Figure 10:
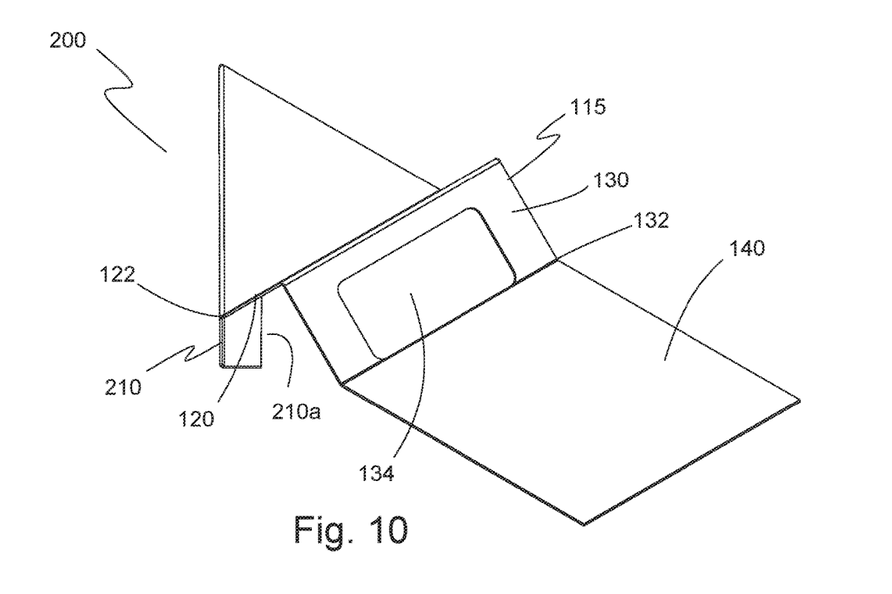
FIG. 10 is a front, perspective view of another embodiment of the present invention showing a chainsaw holder.

Turning now to FIG. 10, another embodiment of the present invention is illustrated. This embodiment is tailored to engage with an aerial fire apparatus. Specifically, this embodiment engages with an aerial fire ladder. The same components in both embodiments have the same reference numbers.

Like the first embodiment, chainsaw holder 200 has a top hook portion 210 with a top hook portion opening 210a, a cutter bar retaining portion 115, and a guard portion 140. Cutter bar retaining portion 115 has a proximal retaining portion end 122 and a distal retaining portion end 132. Between proximal retaining portion end 122 and distal retaining portion end 132 is an entry portion 120 and an exit portion 130. Entry portion 120 is connected to exit portion 130. Entry portion 120 and exit portion 130 are between the top hook portion 210 and the guard portion 140, forming an angled connecting bridge between the top hook portion 210 and the guard portion 140. Exit portion 130 includes first slot 134.

Figure 11:
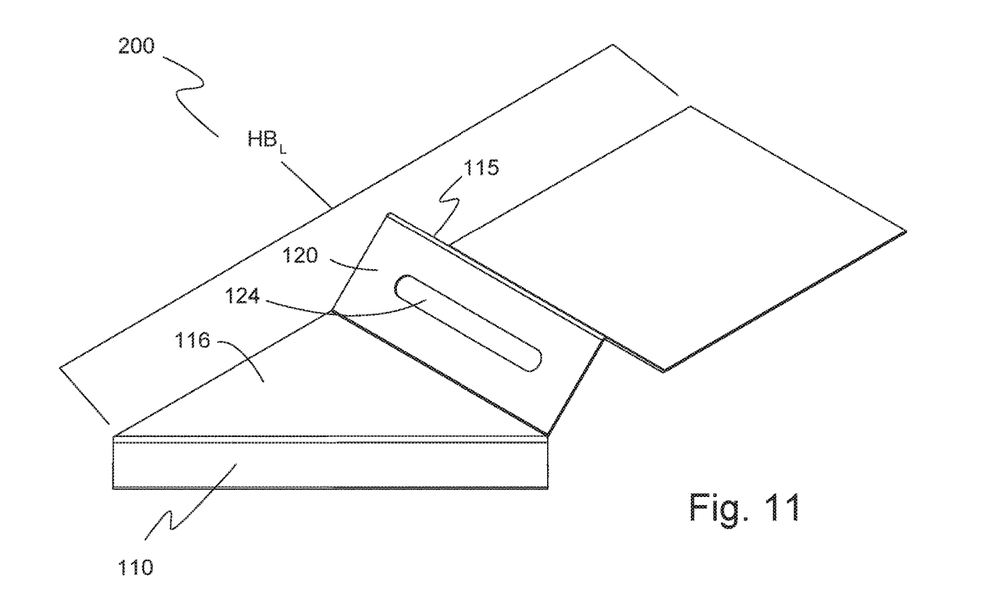
FIG. 11 is a rear, perspective view of the chainsaw holder shown in FIG. 10.

FIG. 11 is a rear perspective view of the chainsaw holder 200. Entry portion 120 has a second slot 124 disposed in and extending completely through the entry portion 120. Entry portion 120 connects third segment 116 to exit portion 130. Similarly, exit portion 130 connects entry portion 120 to guard portion 140. As seen in the FIGS. 1 and 2, cutter bar portion 115 forms a bump out away from top hook portion opening 210a relative to top hook portion 210 and guard portion 140. The major difference between chainsaw holder 200 and chainsaw holder 100 is the angle of top hook portion 210 relative to the holder body length $HB_L$. Instead of being substantially perpendicular to holder body length $HB_L$, top hook portion 210 is transversely angled relative to holder body length $HB_L$. The angle is typically formed to be substantially similar to an angle of a bracing portion of a fire ladder so that when a chainsaw is being held by chainsaw holder 200, the chainsaw cutter bar is in a vertical oriented position as opposed to being in a horizontal oriented position. The typical angle is a 45° angle.

Figures 12, 13:
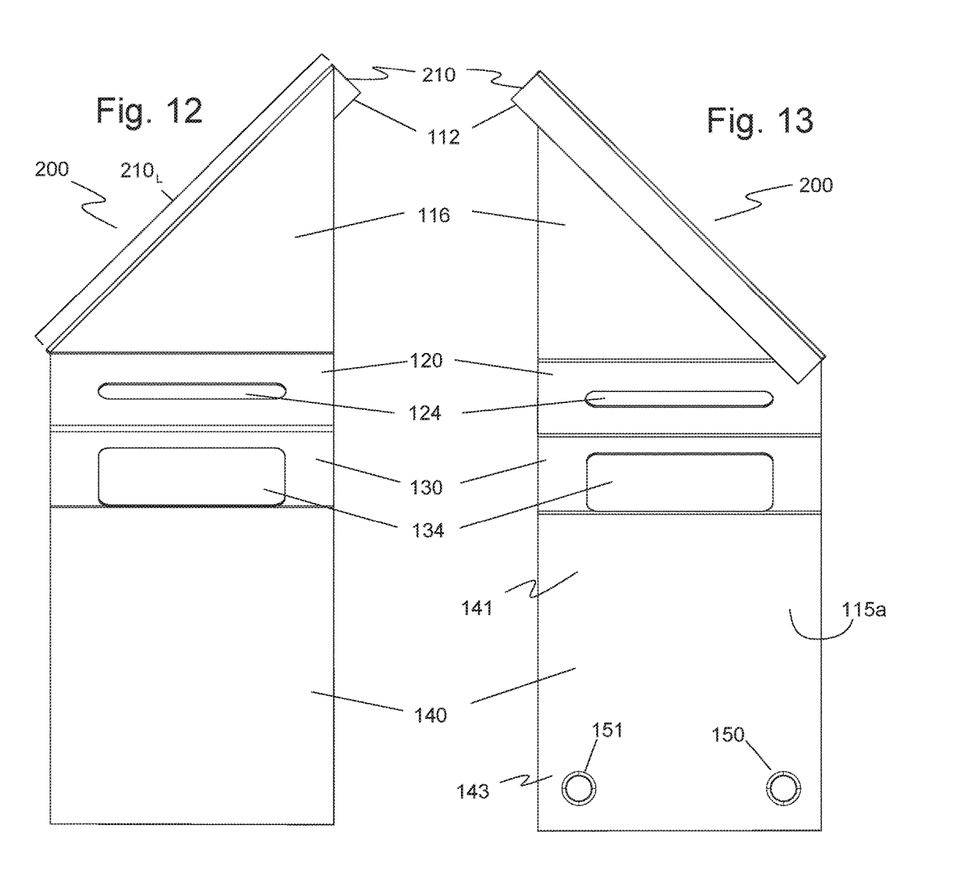
FIG. 12 is a top view of the chainsaw holder shown in FIG. 10.
FIG. 13 is a bottom view of the chainsaw holder shown in FIG. 10.

FIG. 12 shows a top view of chainsaw holder 200. Top hook portion 210 has a third segment 116 connecting second segment 114 to entry portion 120. Entry portion 120 has second slot 124 disposed in and extending completely through the entry portion 120. Entry portion 120 connects top hook portion 210 to exit portion 130 which further connects to guard portion 140.

Figures 8A, 17A:
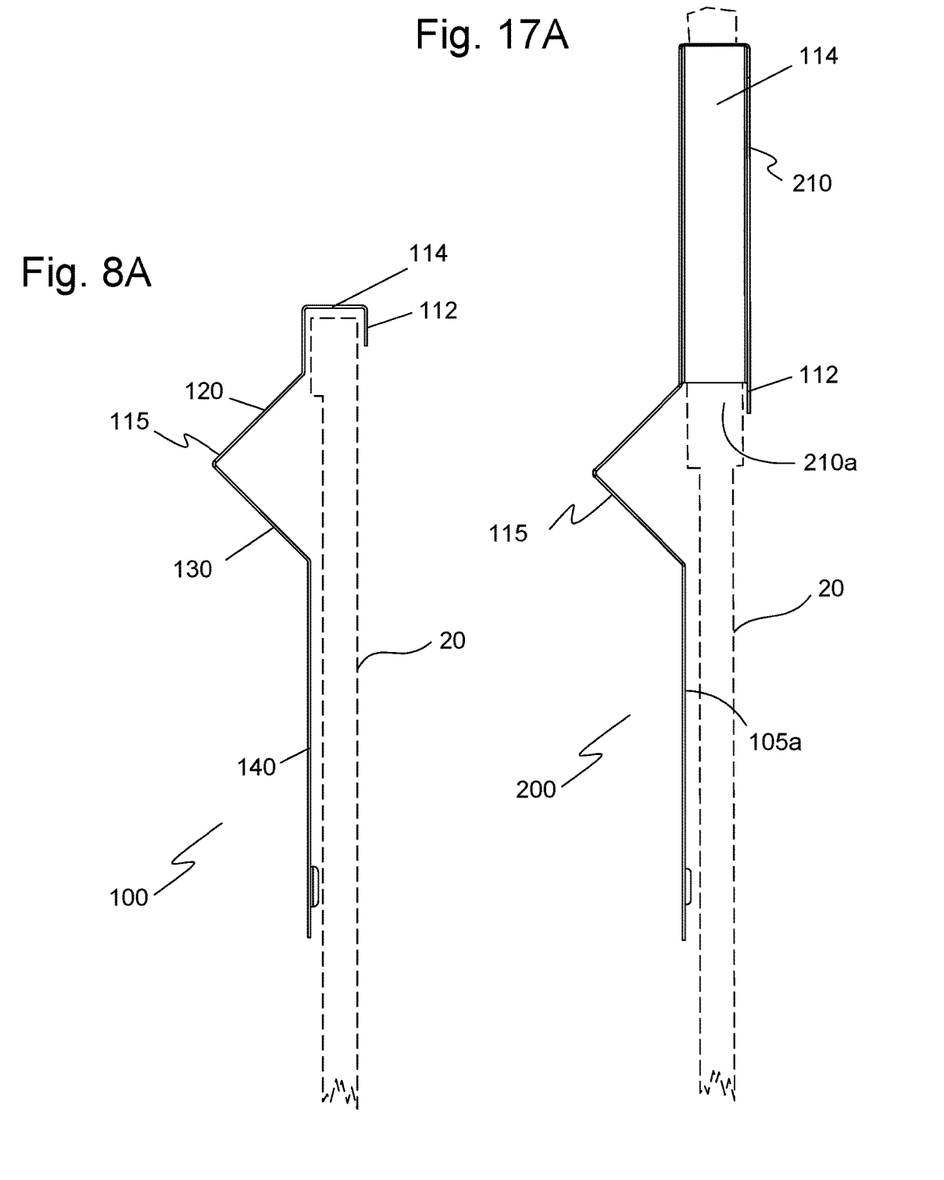
FIG. 8A is the same view of the chainsaw holder shown in FIG. 8, now shown supported on a stationary object.
FIG. 17A is the same view of the chainsaw holder shown in FIG. 17, now shown supported on a sidewall of a relatively stationary object such as one of an aerial bucket lift, an aerial fire bucket, or a ladder apparatus.

Top hook portion 210 has a top hook portion length $210_L$. The lengths of second segment 114 and third segment 116 are equal to top hook portion length $210_L$. As discussed in more detail later and shown in FIG. 8A, and FIG. 17A, the only difference is that the length $210_L$ of the top hook portion 210 is longer than the corresponding top hook portion 110 in the first embodiment due to the angled orientation of top hook portion 210 relative to holder body length $HB_L$. FIG. 8A and FIG. 17A also show these embodiments supported on sidewalls of stationary objects 20 (broken lines used to show a general shape) as discussed in greater detail above.

FIG. 13 shows a bottom view of chainsaw holder 200. Top hook portion 210 has three segments 112, 114, and 116. Top hook portion 210 has a top hook portion width $110_W$ and a top hook portion length $210_L$. First segment 112 and second segment 114 have the same length as top hook portion length $210_L$ in FIG. 12. Third segment 116 connects second segment 114 to entry portion 120 at proximal retaining portion end 122. Entry portion 120 has second slot 124. Entry portion 120 connects top hook portion 110 to exit portion 130 which is further connected to guard portion 140 at distal retaining portion end 132. Exit portion 130 has first slot 134.

Guard portion 140 has a proximal guard segment 141 adjacent distal retaining portion 132 and a distal guard segment 143 opposite proximate guard segment 141. Chainsaw holder 100 has multiple spacer pads 150 and 151 disposed on inside body surface 105a of distal guard segment 143.

Figure 14:
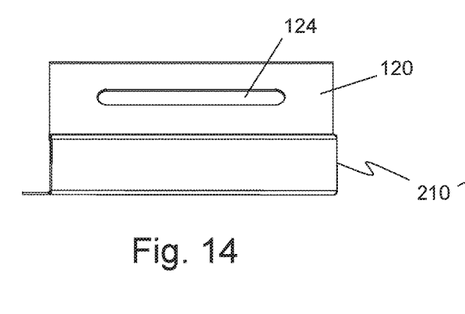
FIG. 14 is a rear plan view of the chainsaw holder shown in FIG. 10.

FIG. 14 shows a rear plan view of chainsaw holder 200. Like the first disclosed embodiment, entry portion 120 has entry portion width between 5 inches and 11 inches with a typical width of 8 inches. Second slot 124 has a second slot width and a second slot length. Second slot 124 may optionally include a second slot radius at the ends of the second slot length. In the present embodiment, the second slot width is typically in a range between 0.25 inch and 0.75 inch with a typical width of 0.625 inch. Top hook portion 210 has a top hook portion length $210_L$. Second segment 114 has a width that is 1 inch or more and connects first segment 112 to third segment 116.

Figure 15:
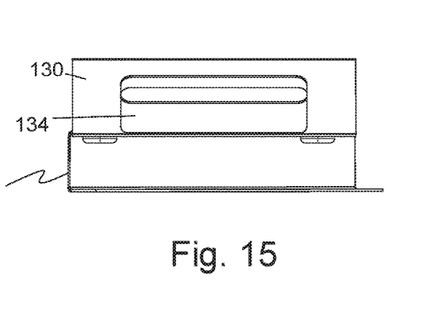
FIG. 15 is a front plan view of the chainsaw holder shown in FIG. 10.

FIG. 15 shows a front plan view of chainsaw holder 200. Exit portion 130 has first slot 134. Exit portion 130 has exit portion width. In the present embodiment, exit portion width is between 5 inches and 11 inches with a typical width of 8 inches. First slot 134 has a first slot width and a first slot length. First slot 134 may optionally include a first slot radius at the ends of first slot length. In the present embodiment, the first slot width is between 1.0 inches and 1.75 inches with a typical width of 1.625 inches. In this embodiment, the first slot width is approximately four times the second slot width, and the first slot length is approximately equal to the second slot length.

Figure 16:
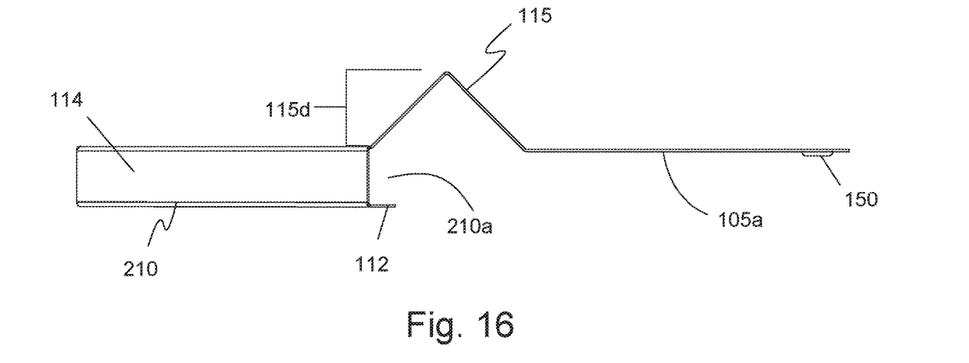
FIG. 16 is a right side view of the chainsaw holder shown in FIG. 10.

FIG. 16 shows a right side view of the present invention. This view as with the similar view of the first disclosed embodiment clearly illustrates the bump out formed by the cutter bar retaining portion 115 and the top hook portion opening 210a. As previously disclosed, the bump out extends away from top hook portion opening 210a and that top hook portion opening 210a is parallel with and extends away from the inside body surface 105a. Top hook portion 210 includes three segments 112, 114, and 116 and hook portion opening 210a. Entry portion 120 connects top hook portion 210 to exit portion 130 which further connects to guard portion 140. Spacer pad 150 is connected to guard portion 140.

Figure 17:
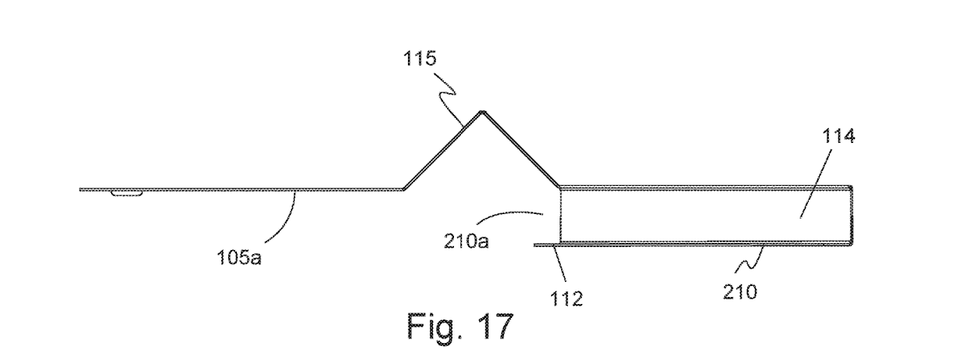
FIG. 17 is a left side view of the chainsaw holder shown in FIG. 10.

FIG. 17 shows a left side view of chainsaw holder 200. The bump out distance 115d of cutter bar retaining portion 115 depends on the angles formed between guard portion 140 and exit portion 130, between exit portion 130 and entry portion 120, and between entry portion 120 and top hook portion 210. The larger the angle between exit portion 130 and entry portion 20, the smaller the bump out distance 115d. Conversely, the smaller the angle between exit portion 130 and entry portion 120, the larger the bump out distance 115d.

FIG. 18 illustrates another embodiment of the present invention showing a chainsaw holder 300 having an integral holder body 107. The difference between this embodiment and the first disclosed embodiment in FIG. 1 is that the cutter bar retaining portion 115' is a separate component that is fixedly attached to the holder body 107 by attachment mechanisms such as, for example, welding, adhesives, ultrasonic bonding, etc., all as is well known in the art. Further, holder body 107 has third segment 116 of top hook portion 210 directly connected to guard portion 140 as a continuous sheet with cutter bar retaining portion 115' fixedly attached to outside surface 105a of holder body 107.

One method of making the present invention is disclosed using a single sheet of bendable yet rigid or semi-rigid material. The method includes obtaining the sheet of material for forming a unitary holder body having two sides and a first end and a second end. A first slot is formed through the unitary holder body where the first slot has a length between the at least two sides. The slot is located a predefined distance from the first end of the unitary holder body. A second slot is formed through the unitary holder body where the second slot has a length between the at least two sides. The second slot is located parallel to the first slot and having a width that is narrower than a width of the first slot and where the first slot is between the second slot and the first end of the unitary holder body. A first bend in created in the unitary holder body at approximately a 45° angle a predefined distance from the first end of the unitary holder body where the first bend is adjacent to the first slot. A second bend is created in the unitary holder body at approximately a 90° angle a predefined distance from the first bend. The second bend is formed in an opposite direction from the first bend, the second bend being at a predefined distance that is at approximately midway between the first slot and the second slot where a sheet portion between the first bend and the second bend forms the exit portion. A third bend is created in the unitary holder body at approximately a 45° angle a predefined distance from the second bend, the third bend being in an opposite direction from the second bend. The third bend is located at a predefined distance that positions the second slot approximately midway between the second bend and the third bend where a portion of the unitary holder body between the second bend and the third bend forms the entry portion. The top hook portion is formed at the second end of the unitary holder body having one of a first orientation or a second orientation.

When selecting the first orientation for the chainsaw holder, the unitary holder body is cut perpendicularly to the holder body width at a predefined distance from the third bend, the predefined distance being sufficient to form the top hook portion at the second end. A fourth bend is created in the unitary holder body at approximately a 90° angle a predefined distance from the third bend, the fourth bend being in an opposite direction from the third bend, and a fifth bend in the unitary holder body is created at approximately a 90° angle a predefined distance from the fourth bend, the fifth bend being formed in the same direction as the fourth bend where the fourth bend and the fifth bend form a U-shaped cross-section.

When selecting the second orientation for the chainsaw holder, the unitary holder body is cut at an angle that is transverse to holder body width forming the second end into an angled end of the unitary holder body that is opposite the first end. A fourth bend is created that is parallel to the angled end of the unitary holder body. The fourth bend is formed at approximately a 90° angle a predefined distance from the angled end, the fourth bend being in an opposite direction from the third bend. A fifth bend is created in the unitary body at approximately a 90° angle a predefined distance between the angled end and the fourth bend and parallel to the angled end. The fifth bend is formed in the same direction as the fourth bend, the fourth bend and the fifth bend forming a U-shaped cross-section.

The present invention may be constructed using many different types of material. In the preferred embodiments, chainsaw holder 100 is made of a rigid or semi-rigid material, such as steel, iron, aluminum, polyvinyl chloride (PVC), acrylic, or other similar material. In the preferred embodiments, the present invention is constructed using a resilient material which is resistant to fire or, more preferably, nonflammable.

Various terminology may be used to describe various embodiments of the present invention. Some of the equivalents are provided herein. Chainsaw holder 100 may also be referred to as a holster, chainsaw holder, tool sheath, chainsaw holster, chainsaw holder, or chainsaw sheath. Top hook portion 110 may be referred to as a hook, hook portion, or mounting portion. Entry portion 120 may be referred to as a stop member, selective entry portion, or receptive portion. Exit portion 130 may be referred to as a guide member, egress portion, or emergence portion. Entry portion 120 and exit portion 130 may collectively be referred to as a stabilizer, stabilizing portion, stabilizing unit, engagement portion, or engaging unit. Guard portion 140 may be referred to as an protective wall portion. Hassocks 150 and 151 may be referred to as hassock portions, buffer portions, cushion portions, or bumper portions.

Although some preferred embodiments of the present invention are described herein, those skilled in the respective arts will recognize modifications, some of which may be preferred in certain situations. For example, some embodiments of the present invention may have a plurality of stabilizing units. Some embodiments may have the apertures in a first stabilizing unit varying in size from the apertures in a second stabilizing unit, and some stabilizing units may have only a single aperture.

The present invention may be tailored for use with various tools and for various circumstances. The embodiments shown are particularly useful for holding a chainsaw to an aerial fire apparatus; however, those skilled in the respective arts will recognize that the invention may be used to hold other tools, such as a sledge hammer or shovel, and in numerous situations, such as to increase workshop capacity or improve tool storage for roof work.

Thus, the above description is merely illustrative. Further modification of the invention herein disclosed will occur to those skilled in the respective arts and all such modifications are deemed to be within the scope of the invention as defined by the appended claims.

What is claimed is:

1. A chainsaw holder for holding a chainsaw having a cutter bar with a proximal end and a distal end, the chainsaw holder comprising:
    a unitary holder body, being formed of a single sheet of material, comprising:
        an inside body surface;
        an outside body surface;
        a holder body width;
        a holder body length that is greater than the holder body width;
        a top hook portion having a top hook portion opening oriented parallel to the inside surface;
        a cutter bar retaining portion having a proximal retaining portion end and a distal retaining portion end, the cutter bar retaining portion connected on the proximal retaining portion end to the top hook portion; and
        a guard portion connected to and extending from the distal retaining portion end;
        wherein the cutter bar retaining portion forms a bump out that extends away from the top hook portion opening and relative to the top hook portion and the guard portion;
        wherein the cutter bar retaining portion having an entry portion, with a first slot extending completely through the entry portion, and an exit portion with a second slot extending completely through the exit portion; and
        wherein the second slot and the first slot are aligned to thereby allow a distal end of the cutter bar of the chainsaw to extend through the first slot and the second slot, such that the first slot is adjacent the proximal end of the cutter bar of the chainsaw.

2. The chainsaw holder of claim 1 wherein the top hook portion has a first segment, a second segment extending perpendicularly from the first segment, and a third segment extending perpendicularly from the second segment and parallel to and facing the first segment wherein the third segment extends to and is connected to the proximal retaining portion end of the cutter bar retaining portion and wherein the first segment, the second segment and a portion of the third segment form a U-shaped cross-section portion.

3. The chainsaw holder of claim 2 wherein the U-shaped cross-section portion is transverse to the holder body length.

4. The chainsaw holder of claim 3 wherein the U-shaped cross-section portion is approximately perpendicular to the holder body length.

5. The chains saw holder of claim 3 wherein the U-shaped cross-section portion is approximately at a 45° angle to the holder body length.

6. The chainsaw holder of claim 1 further comprising at least one bumper portion attached to the guard portion on the inside body surface.

7. The chainsaw holder of claim 1 wherein the entry portion meets the exit portion at an approximate right angle.

8. The chainsaw holder of claim 1 wherein the top hook portion is adapted to attach to an object which is stationary relative to the chainsaw holder once attached.

9. The chainsaw holder of claim 8 wherein the object is one of an aerial bucket lift, an aerial fire bucket or a ladder apparatus.

10. The chainsaw holder of claim 8 wherein the exit portion aperture is a slot having a length that is 1.1 to 1.7 times a width of the cutter bar and a width that is in a range of 2.0 to 4.4 times a thickness of the cutter bar.

11. The chainsaw holder of claim 1 wherein the entry portion aperture is a slot having a length that is 1.1 to 1.7 times a width of the cutter bar and a width that is in a range of 1.1 to 1.3 times a thickness of the cutter bar.

12. The chainsaw holder of claim 1 wherein the exit portion aperture is a slot having a width larger than the width of the entry portion aperture.

13. The chainsaw holder of claim 1 wherein a ratio of the holder body length to the holder body width is in a range of 2.0 to 3.8.

14. The chainsaw holder of claim 1 wherein the entry portion and the exit portion together have a lineal distance of approximately 6 inches.

15. A method of making a chainsaw holder capable of being attached to an object which is stationary relative to the chainsaw holder, the method comprising:
    obtaining a sheet of rigid, or semi-rigid, material forming a unitary holder body having at least two sides and a first end and a second end;
    forming a first slot through the unitary holder body wherein the first slot has a length between the at least two sides, the first slot being a predefined distance from the first end of the unitary holder body;
    forming a second slot through the sheet wherein the second slot has a length between the at least two sides, the second slot being parallel to the first slot and having a width that is narrower than a width of the first slot wherein the first slot is between the second slot and the first end of the unitary holder body;
    creating a first bend in the unitary holder body at approximately a 45° angle at a predefined distance from the first end of the unitary holder body, the first bend being adjacent to the first slot;
    creating a second bend in the unitary holder body at approximately a 90° angle at a predefined distance from the first bend, the second bend being in an opposite direction from the first bend, the second bend being at a predefined distance that is at approximately midway between the first slot and the second slot wherein a portion of the unitary holder body between the first bend and the second bend forms an exit portion;

creating a third bend in the unitary holder body at approximately a 45° angle at a predefined distance from the second bend, the third bend being in an opposite direction from the second bend, the third bend being at a predefined distance that positions the second slot approximately midway between the second bend and the third bend wherein a portion of the unitary holder body between the second bend and the third bend forms an entry portion;

forming a top hook portion at the second end of the unitary holder body comprising selecting one of a first orientation or a second orientation:

a) when selecting the first orientation, cutting the unitary holder body perpendicularly to a holder body width at a predefined distance from the third bend, the predefined distance being sufficient to form the top hook portion at the second end;

creating a fourth bend in the unitary holder body at approximately a 90° angle at a predefined distance from the third bend, the fourth bend being in an opposite direction from the third bend; and creating a fifth bend in the unitary holder body at approximately a 90° angle at a predefined distance from the fourth bend, the fifth bend being formed in the same direction as the fourth bend, the fourth bend and the fifth bend forming a U-shaped cross-section; or b) when selecting the second orientation, cutting the unitary holder body at an angle that is transverse to holder body width and forming the second end into an angled end of the unitary holder body that is opposite the first end of the sheet;

creating a fourth bend that is parallel to the angled end of the unitary holder body, the fourth bend being at approximately a 90° angle at a predefined distance from the angled end, the fourth bend being in an opposite direction from the third bend; and creating a fifth bend in the unitary body at approximately a 90° angle at a predefined distance between the angled end and the fourth bend, the fifth bend being formed in the same direction as the fourth bend, the fourth bend and the fifth bend forming a U-shaped cross-section.

16. The method of claim 15 wherein creating the second bend a predefined distance from the first bend includes creating the second bend approximately 3 inches from the first bend.

17. The method of claim 15 wherein creating the third bend a predefined distance from the second bend includes creating the second bend approximately 3 inches from the second bend.

\* \* \* \* \*